(12) United States Patent
Grimsrud et al.

(10) Patent No.: US 7,515,528 B2
(45) Date of Patent: Apr. 7, 2009

(54) HOST FAIL-OVER SWITCH PRESENCE DETECTION COMPATIBLE WITH EXISTING PROTOCOL AND HOST CONTROLLERS

(75) Inventors: Knut S. Grimsrud, Forest Grove, OR (US); Amber D. Huffman, Banks, OR (US)

(73) Assignee: Intel Corporation, Santa Clara, CA (US)

( * ) Notice: Subject to any disclaimer, the term of this patent is extended or adjusted under 35 U.S.C. 154(b) by 790 days.

(21) Appl. No.: 10/816,131

(22) Filed: Mar. 31, 2004

(65) Prior Publication Data

US 2005/0220008 A1    Oct. 6, 2005

(51) Int. Cl.
*G01R 31/08* (2006.01)

(52) U.S. Cl. .................. 370/218; 370/220; 370/244; 370/419; 710/10

(58) Field of Classification Search .................. 370/219, 370/220, 218, 221, 242, 244, 419; 710/8, 710/10, 105
See application file for complete search history.

(56) References Cited

U.S. PATENT DOCUMENTS

| | | | |
|---|---|---|---|
| 6,622,195 B2 * | 9/2003 | Osakada et al. ............. 710/316 |
| 6,842,817 B2 * | 1/2005 | Avery ......................... 710/306 |
| 6,948,036 B2 * | 9/2005 | Grieff et al. ................. 711/151 |
| 7,039,064 B1 * | 5/2006 | Paulson et al. .............. 370/459 |
| 7,111,158 B1 * | 9/2006 | Burroughs et al. ............. 713/1 |
| 2004/0252716 A1 * | 12/2004 | Nemazie ..................... 370/447 |
| 2005/0018668 A1 * | 1/2005 | Cheriton ..................... 370/389 |
| 2005/0060432 A1 * | 3/2005 | Husain et al. ............... 709/246 |

* cited by examiner

*Primary Examiner*—Ricky Ngo
*Assistant Examiner*—Kibrom T Hailu
(74) *Attorney, Agent, or Firm*—Blakely, Sokoloff, Taylor & Zafman LLP

(57) ABSTRACT

A method and apparatus for detecting a presence of a fail over switch is described. In one embodiment, during an Serial ATA sequence initialization handshake, a host transmits a COM-RESET to a device. In return, the host receives a COMWAKE from the device. If the host is of a first type of host, then the host identifies a presence of a fail over switch, in response to receipt of the COMWAKE. If the host is of a second type of host, then the host ignores the COMWAKE. The host then receives a COMINIT from the device, in accordance with the Serial ATA sequence handshake. The host transmits a COM-WAKE to the device, and the host receives a COMWAKE in return from the device.

22 Claims, 3 Drawing Sheets

HOST FAIL-OVER SWITCH PRESENCE DETECTION COMPATIBLE WITH EXISTING PROTOCOL AND HOST CONTROLLERS

FIELD OF INVENTION

The field of invention relates generally to detecting the presence of a host fail-over switch.

BACKGROUND

A Serial ATA (AT Attachment) fail over switch (sometimes referred to as a "Port Selector") is a component that may provide two paths to a device (e.g., storage device), of which one is the selected/active port/connection. Upon detection by a standby system that the host or host controller communicating through the active port has failed, the active port is switched such that the standby system can take over and continue to have access to the storage device. This is a common approach taken in high-availability and redundant systems such as airline reservation systems, banking systems, and other mission-critical systems where continual up-time is a requirement.

The Serial ATA fail over switch as originally defined was completely transparent to both the device being accessed and the attached hosts. It was so transparent that its presence could not be directly detected and instead had to be inferred by attempting to cause it to switch and determining if a switch occurred. Furthermore, the fail over switch market requirements were that fail over switches be supportable with existing Serial ATA host controllers, so any new feature added to them must be benign/compatible with the controllers already on the market.

DETAILED DESCRIPTION

In the following description, numerous specific details are set forth. However, it is understood that embodiments may be practiced without these specific details. In other instances, well-known circuits, structures and techniques have not been shown in detail in order not to obscure the understanding of this description.

Reference throughout this specification to "one embodiment" or "an embodiment" indicate that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

A method and apparatus for detecting a presence of a fail over switch is described. One embodiment provides a protocol transparent presence detection technique that allows the presence of a fail over switch to be determined by host controllers that support the detection technique, while remaining transparent to host controllers that do not have support for the detection signal. One embodiment allows detection to be done without adding any additional signals or wires to the fail over switch.

One embodiment of the presence detection signal uses a signal of the general Serial ATA initialization handshake sequence as defined in the Serial ATA 1.0 specification. In that sequence, a number of handshakes are defined to complete the entire sequence. To make the sequence robust in the face of various transients and to accommodate such things as impedance calibration, the protocol of the Serial ATA specification is insensitive to reception of any signals other than the specific handshake signals expected.

In one embodiment, during the device presence handshake phase of the initialization sequence (where the host is defined in the Serial ATA specification to be insensitive to received signals other than the specific next handshake signal), an OOB (out of band) signal, other than the one the protocol calls for, is inserted, in accordance with one embodiment. This additional signal is ignored by current hosts but can be detected by host controllers that support fail over switch presence detection, in accordance with the description herein. After the newly inserted OOB signal, the traditional OOB handshake signals are transmitted to complete the handshake. A host capable of presence detection would detect the reception of the additional OOB signal and use that as indication of the presence of a fail over switch, while existing hosts that do not comprehend this signal would ignore it.

Figure 1:
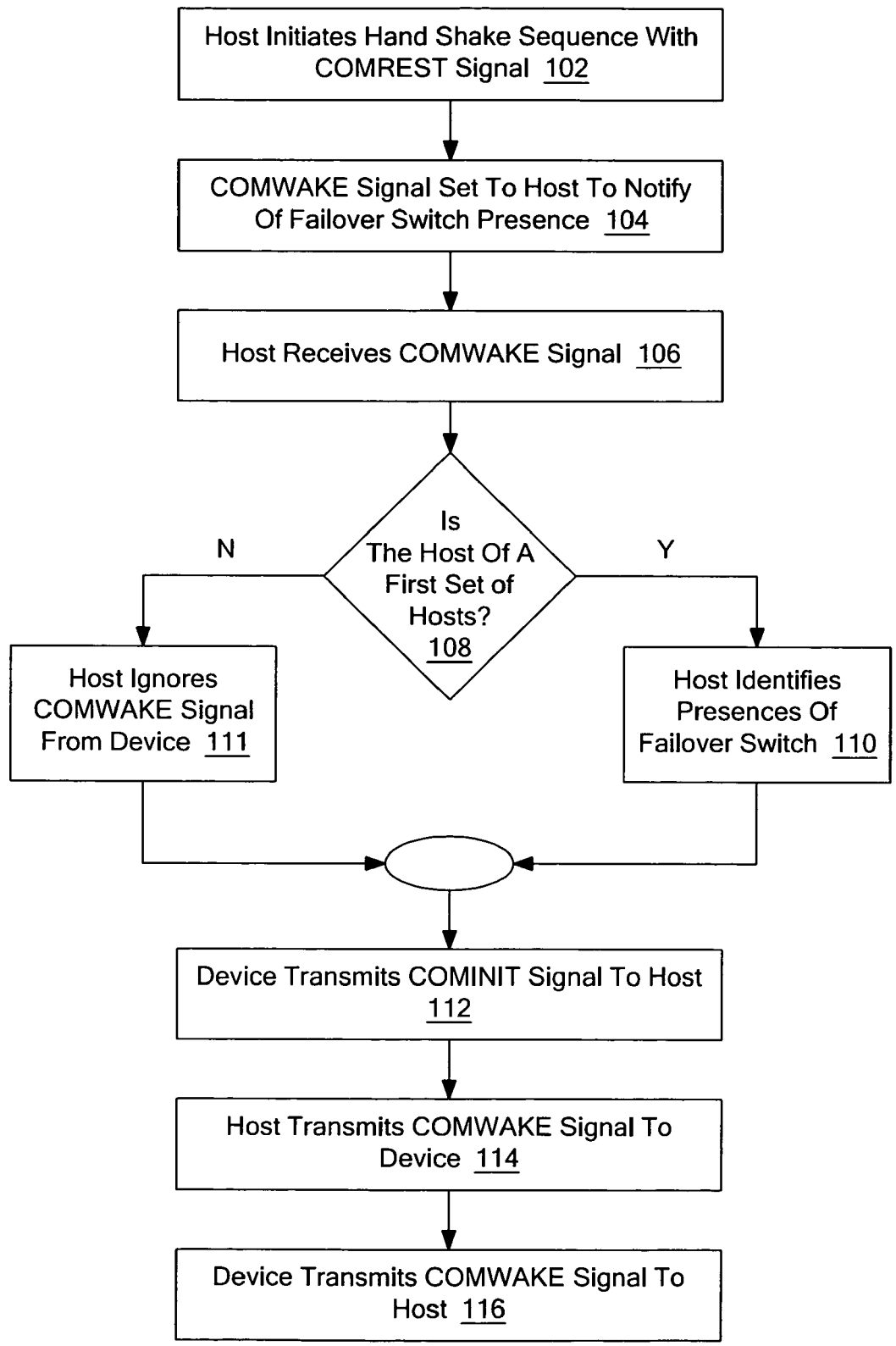
FIG. 1 present a flow diagram describing the process of detecting a presence of a fail over switch, in accordance with one embodiment.
Figure 2:
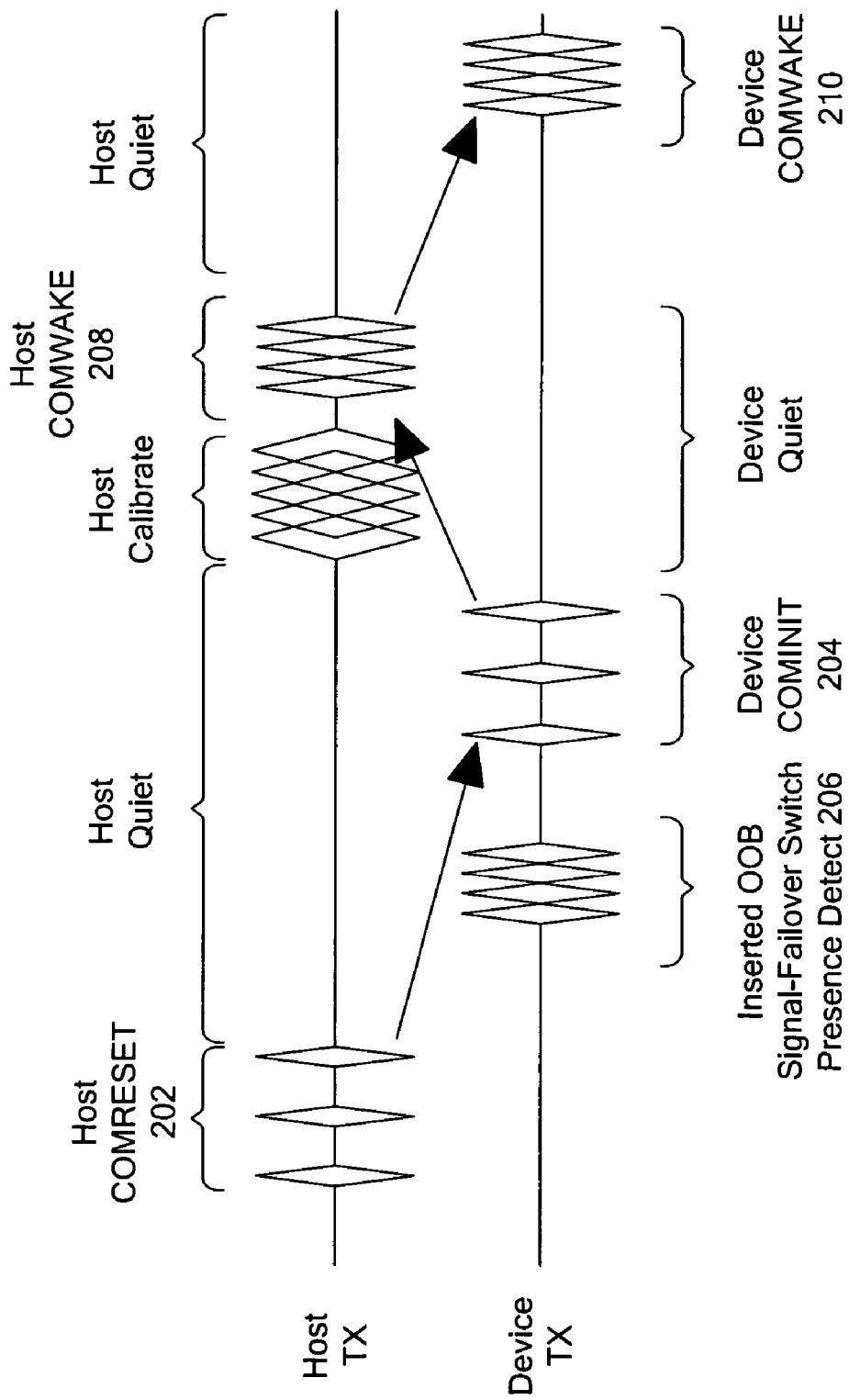
FIG. 2 illustrate a signal diagram showing the exchange of signals to identify the presence of a fail over switch, in accordance with one embodiment.
Figure 3:
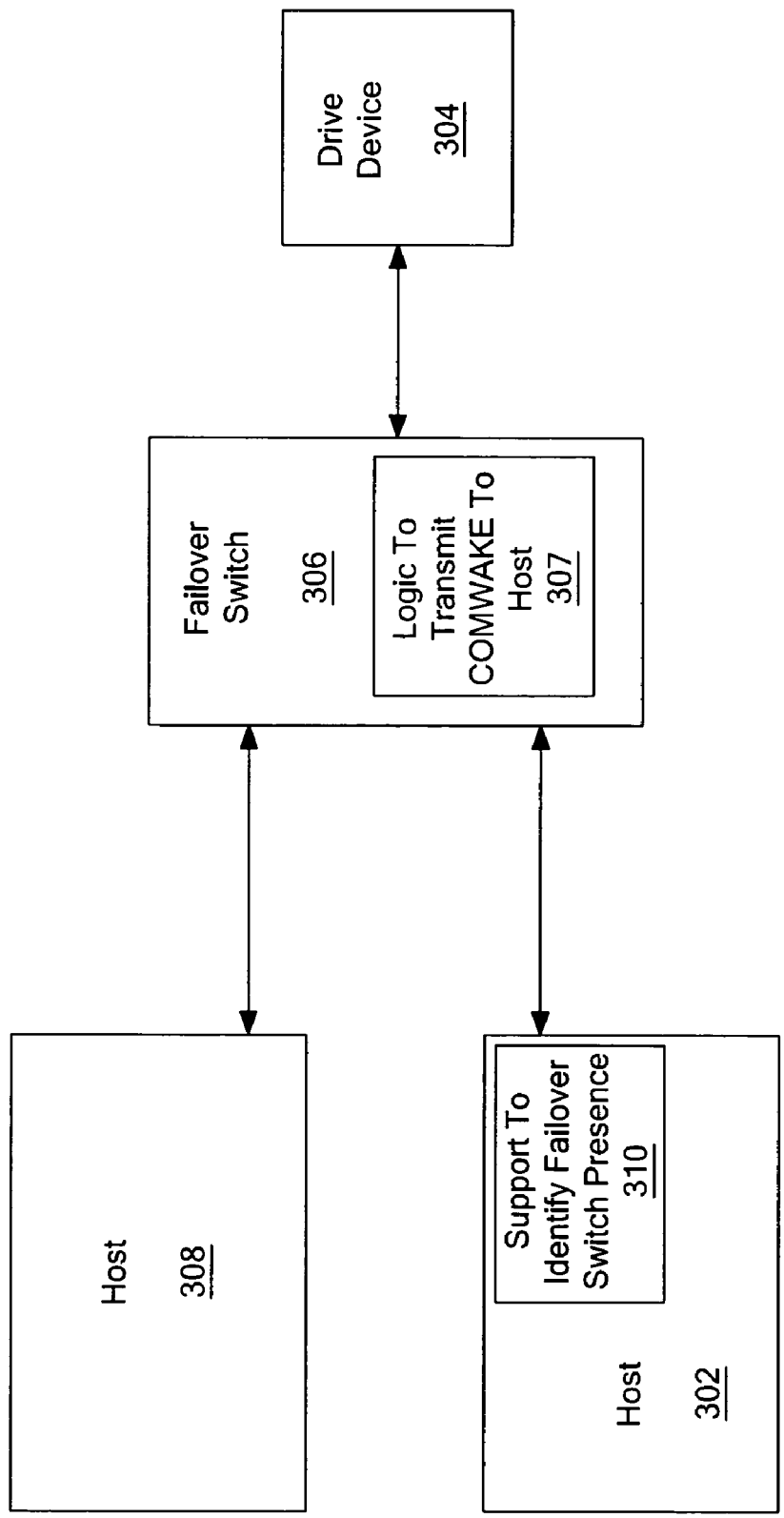
FIG. 3 presents a system diagram of a host and a device to exchange signals to identify the presence of a fail over switch, in accordance with one embodiment.

FIG. 1 presents a flow diagram describing the process of detecting a presence of a fail-over switch, in accordance with one embodiment. The processes of FIG. 1 are described in reference to the signal diagram of FIG. 2 and the system of FIG. 3. The description below describes the transmission of signals compatible with the Serial ATA 1.0 specification. In alternative embodiments, if a host and device are communicating in accordance with a separate protocol or specification, alternative signals could be used in place of the signals described below.

In process 102, the host 302 initiates a handshake initialization sequence with the device 304. In one embodiment, the host 302 transmits a COMRESET signal 202. In accordance with the Serial ATA 1.0 specification, the next signal transmission in the handshake sequence would be the device 304 responding with a COMINIT signal 204. However, in process 104, in one embodiment, the switch 306 inserts an OOB signal 206 to notify the host 302 of the presence of the fail over switch 306. In one embodiment, the inserted OOB signal 206 is a COMWAKE signal. In one embodiment, a unit of logic 307 within the switch 306 would identify the initial COMREST signal 202 being transmitted to the device 304 to initiate the handshake sequence, and the logic 307 of the switch would have the signal 206 transmitted to the host before conveying the device response to the initial signal to the host.

In alternative embodiments, alternative signals could be used in place of the COMWAKE signal. In yet another alternative embodiment, the switch may not transmit the inserted signal 206. Rather, the device 304 may send an OOB signal 206 to the host prior to sending the COMININT signal 204, to identify the presense of the fail over switch 306. Furthermore, in yet another alternative embodiment, the inserted signal 206 may be an in band signal.

In process 106, the host 302 receives the OOB signal 206 from the device. In process 108, a determination is made on whether the host 302 is of a first set of hosts, or is of a second set of hosts. In process 110, if the host 302 is of a first set of hosts configured to read and identify the inserted signal 206 as identifying the presence of a fail over switch 306, the host 302 then identifies the presence of a fail over switch 306 accordingly. In process 111, if the host 302 is of a second set of hosts not configured to read and identify the inserted signal 206 as identifying the presence of a fail over switch 306, the host 302 then ignores the signal 206.

Thereafter, the handshake sequence continues in accordance with the pre-established protocol. For example, the case of the Serial ATA 1.0 specification, in one embodiment, in process 112, the device 304 transmits a COMINIT signal 204 to the host 302. In process 114, the host 302 responds with a COMWAKE signal 208 to the device 304. In process 116, the device responds to the host with a COMWAKE signal 210.

The processes discussed above can be stored on a machine-accessible medium. Thus, a machine-accessible medium includes any mechanism that provides (i.e., stores and/or transmits) information in a form accessible by a machine (e.g., a computer, network device, personal digital assistant, manufacturing tool, any device with a set of one or more processors, etc.). For example, a machine-accessible medium includes recordable/non-recordable media (e.g., read only memory (ROM); random access memory (RAM); magnetic disk storage media; optical storage media; flash memory devices; etc.).

In one embodiment, logic 307 of switch 306 and logic 310 of the host, are provided to support and perform the sequence as described herein, could be embedded as internal logic of a circuit or implemented with an integral state machine a circuit, in the host 302, switch 306, and/or the device 304. Having the sequence embedded in the logic of a circuit, and/or implemented in an integral state machine of a circuit, may also be referenced as being stored on a machine-accessible medium.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method comprising:
a host transmitting a first signal to a first device coupled with a second device;
in response to the first signal, the second device transmitting a second signal transmitted to the host prior to transmission of a third signal from the first device to the host in a handshake initialization sequence, the second device to consecutively transmit the second signal and the third signal to the host;
the host detecting a presence of the second device, in response to receipt of the second signal if the host is of a first set of hosts; and
the host ignoring the second signal if the host is of a second set of hosts.

2. The method of claim 1, wherein the second device is a fail over switch.

3. The method of claim 1, further comprising:
the host transmitting the second signal to the first device; and
the host receiving a second signal from the first device.

4. The method of claim 1, performed during a handshake initialization sequence between the host and the first device.

5. The method of claim 3, wherein the second signal is a Serial ATA out of band (OOB) signal.

6. The method of claim 2, wherein the fail-over switch is a Serial ATA fail over switch.

7. A machine-accessible medium that provides instructions that, if executed by a machine, will cause said machine to perform operations comprising:
a host transmitting a first signal to a first device coupled with a second device;
the second device transmitting a second signal to the host prior to transmission of a third signal from the first device to the host in a handshake initialization sequence, the second device to consecutively transmit the second signal and the third signal to the host;
the host identifying a presence of the second device, in response to receipt of the second signal;
the host receiving the third signal from the first device;
the host transmitting the second signal to the first device; and
the host receiving the second signal from the first device.

8. The machine-accessible medium of claim 7, wherein the operations are performed during a handshake initialization sequence between the host and the first device.

9. The machine-accessible medium of claim 7, wherein the second signal is a Serial ATA out of band (OOB) signal.

10. The machine-accessible medium of claim 7, wherein the medium is one of an internal logic of a circuit and an internal state machine of a circuit.

11. A machine-accessible medium that provides instructions that, if executed by a machine, will cause said machine to perform operations comprising:
a host transmitting a COMRESET to a device coupled with a switch;
the host receiving a COMWAKE originating from the switch prior to receiving a COMINIT from the device in a handshake initialization sequence, the switch to consecutively transmit the COMWAKE and the COMINIT to the host;
the host identifying a presence of the switch, in response to receipt of the COMWAKE;
the host receiving the COMINIT from the device;
the host transmitting the COMWAKE to the device; and
the host receiving the COMWAKE from the device.

12. The machine-accessible medium of claim 11, wherein the operations are performed during a handshake initialization sequence between the host and the device.

13. The machine-accessible medium of claim 11, wherein the medium is one of an internal logic of a circuit and an internal state machine of a circuit.

14. A system comprising:
a processor; and
a machine-accessible medium that provides instructions that, if executed by the processor, will cause the processor to perform operations comprising:
transmit a COMRESET to a device coupled with a fail over switch;
receive a COMWAKE originating from the fail over switch prior to receiving a COMINIT from the device in a handshake initialization sequence, the COMWAKE and the COMINIT to be received consecutively from the fail over switch;
identify a presence of the fail over switch, in response to receipt of the COMWAKE;
receive the COMINIT from the device;
transmit the COMWAKE to the device; and
receive the COMWAKE from the device.

15. The system of claim 14, wherein the fail-over switch is a Serial ATA fail over switch.

16. The system of claim 14, wherein the operations are performed during a handshake initialization sequence between the system and the device.

17. The system of claim 14, wherein the medium is one of an internal logic of a circuit and an internal state machine of a circuit.

18. A system comprising:
 a processor;
 a network connection; and
 a machine-accessible medium that provides instructions that, if executed by a machine, will cause said machine to perform operations comprising:
 transmitting a first signal to a first device coupled with a second device;
 receiving a second signal and a third signal consecutively before transmitting the second signal in a handshake initialization sequence;
 identifying a presence of the second device, in response to receipt of the second signal;
 transmitting the second signal to the first device; and
 receiving the second signal from the first device.

19. The system of claim 18, wherein the second device is a fail over switch.

20. The system of claim 18, wherein the operations are performed during a handshake initialization sequence between the system and the first device.

21. The system of claim 18, wherein the medium is one of an internal logic of a circuit and an internal state machine of a circuit.

22. A system comprising:
 a host controller to initiate a handshake initialization sequence;
 a serial ATA device to participate in the handshake initialization sequence; and
 a fail over switch to consecutively transmit an out of band signal and a standard handshake signal to the host controller during the handshake initialization sequence after the host controller initiates the handshake initialization sequence and before the host controller transmits a subsequent signal to the serial ATA device, the out of band signal notifies the host controller that a switch between a first path and a second path of the fail over switch has occurred.

* * * * *